(12) United States Patent
Beaupre et al.

(10) Patent No.: US 12,313,442 B2
(45) Date of Patent: May 27, 2025

(54) METHOD AND SYSTEM FOR CONFIRMING DELIVERY OF BULK MATERIAL FROM A BED OF A DUMP TRUCK

(71) Applicant: Command Alkon Incorporated, Birmingham, AL (US)

(72) Inventors: Denis Beaupre, Quebec (CA); Steve Cox, Birmingham, AL (US)

(73) Assignee: Command Alkon Incorporated, Birmingham, AL (US)

( * ) Notice: Subject to any disclaimer, the term of this patent is extended or adjusted under 35 U.S.C. 154(b) by 906 days.

(21) Appl. No.: 17/594,120

(22) PCT Filed: Mar. 31, 2020

(86) PCT No.: PCT/US2020/025895
§ 371 (c)(1),
(2) Date: Oct. 4, 2021

(87) PCT Pub. No.: WO2020/219237
PCT Pub. Date: Oct. 29, 2020

(65) Prior Publication Data
US 2022/0214209 A1    Jul. 7, 2022

Related U.S. Application Data

(60) Provisional application No. 62/837,864, filed on Apr. 24, 2019.

(51) Int. Cl.
*B60P 1/16*    (2006.01)
*G01G 19/10*  (2006.01)
*G01S 19/42*  (2010.01)

(52) U.S. Cl.
CPC ............... *G01G 19/10* (2013.01); *B60P 1/16* (2013.01); *G01S 19/42* (2013.01)

(58) Field of Classification Search
CPC ........ G01G 19/10; G01G 19/08; G01S 19/42; B60P 1/16
(Continued)

(56) References Cited

U.S. PATENT DOCUMENTS 6,611,755 B1    8/2003    Coffee et al.
7,904,219 B1    3/2011    Lowery et al.
(Continued)

FOREIGN PATENT DOCUMENTS

CN    106574862 A  *  4/2017  ............. B60P 1/045
CN    111595426 A  *  8/2020  ............. E02F 3/283
(Continued)

*Primary Examiner* — Hilary L Gutman
(74) *Attorney, Agent, or Firm* — Wiley Rein LLP

(57) ABSTRACT

A method for confirming delivery of bulk material from a bed of a dump truck based on hydraulic pressure. The dump truck has a driving device moving the bed between a rest position and a delivery position. The method generally having: using a hydraulic pressure sensor, measuring a plurality of hydraulic pressure values indicative of pressure of a hydraulic fluid of the driving device as the bed is moved; and using a controller communicatively coupled to the hydraulic pressure sensor: monitoring a slope at which at least some of the plurality of hydraulic pressure values vary over a given period of time; and generating a delivery confirmation indicative that a delivery of the bulk material has occurred based on a comparison between the monitored slope and a delivery slope threshold.

20 Claims, 7 Drawing Sheets

(58) Field of Classification Search
USPC .......................................................... 298/1 R
See application file for complete search history.

(56) References Cited

U.S. PATENT DOCUMENTS

| | | | |
|---|---|---|---|
| 8,020,431 | B2 | 9/2011 | Cooley et al. |
| 8,437,982 | B2* | 5/2013 | Minoshima ............ G01G 19/10 |
| | | | 702/174 |
| 10,049,574 | B2* | 8/2018 | Ohsugi ................ B60W 30/085 |
| 2003/0004747 | A1 | 1/2003 | Burton |
| 2005/0167164 | A1 | 8/2005 | Takeda |
| 2011/0010040 | A1 | 1/2011 | Ichinose et al. |
| 2015/0025756 | A1* | 1/2015 | Itai .......................... B60P 1/283 |
| | | | 701/50 |
| 2015/0149238 | A1 | 5/2015 | Glustrom et al. |
| 2016/0171434 | A1 | 6/2016 | Ladden et al. |
| 2016/0257236 | A1* | 9/2016 | Baldys .................. F15B 13/024 |
| 2017/0021751 | A1* | 1/2017 | Baldys .................... B60P 1/045 |
| 2018/0046981 | A1 | 2/2018 | Honig et al. |
| 2018/0065533 | A1* | 3/2018 | Hertog ...................... B60P 1/16 |
| 2018/0111536 | A1* | 4/2018 | Fushiki .................... B60P 1/04 |
| 2018/0111537 | A1* | 4/2018 | Baldys .................... B60P 1/162 |
| 2019/0347612 | A1* | 11/2019 | Anders .................... G01S 19/42 |
| 2023/0249602 | A1* | 8/2023 | Randle ..................... B60P 1/16 |
| | | | 298/22 C |

FOREIGN PATENT DOCUMENTS

| | | | | |
|---|---|---|---|---|
| FR | 3102421 A1 * | 4/2021 | ............. | B60D 1/015 |
| GB | 2537591 A | 3/2015 | | |
| JP | 09311067 A | 12/1997 | | |

* cited by examiner

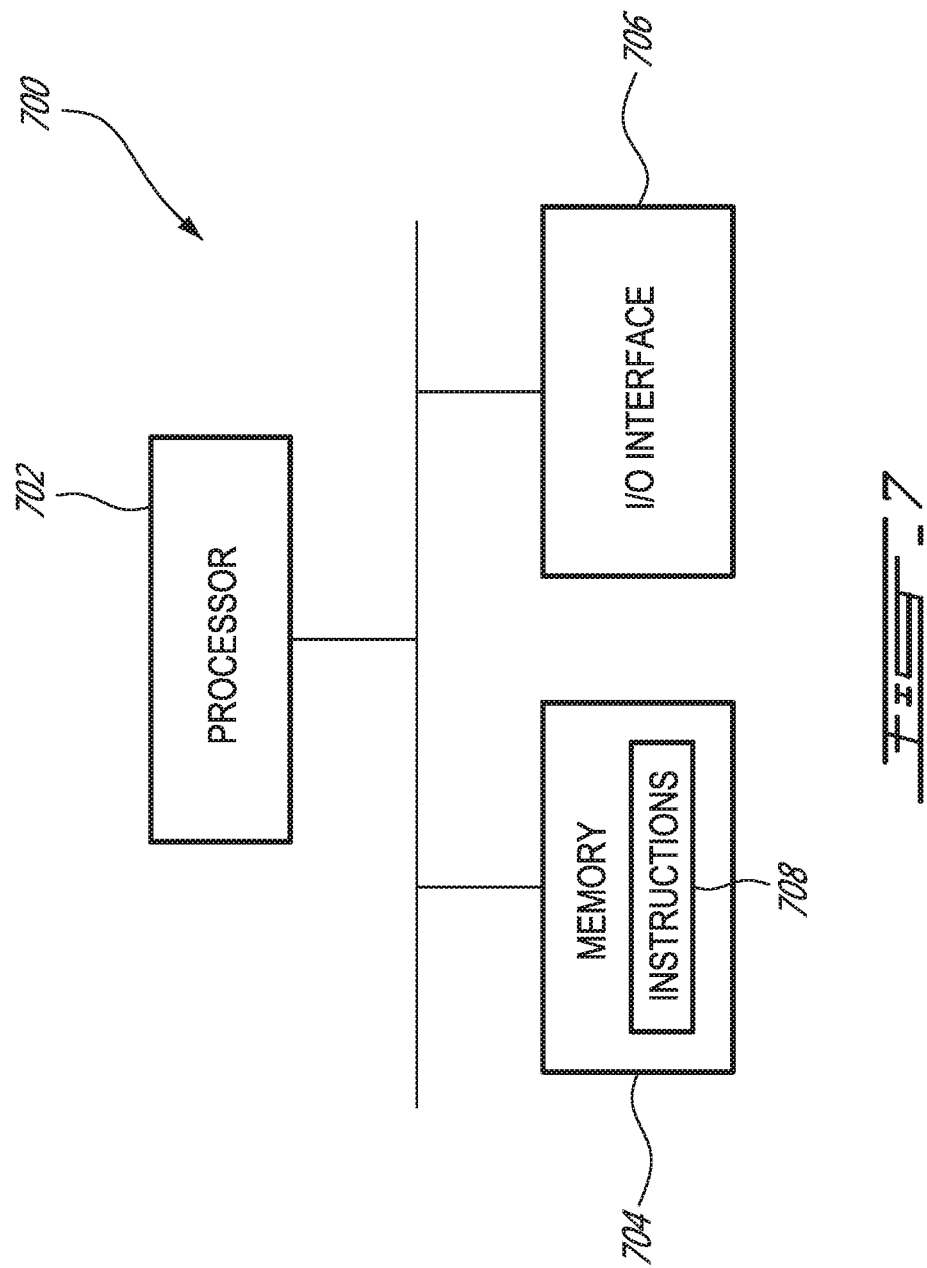

METHOD AND SYSTEM FOR CONFIRMING DELIVERY OF BULK MATERIAL FROM A BED OF A DUMP TRUCK

CROSS-REFERENCE TO RELATED APPLICATIONS

This application claims the benefit of U.S. provisional application No. 62/837,864, filed 24 Apr. 2019, which is hereby incorporated by reference as though fully set forth herein.

FIELD

The improvements generally relate to dump trucks transporting and delivering bulk material, and more particularly relate to confirming that a given delivery of the bulk material has occurred.

BACKGROUND

A dump truck is generally used for transporting bulk material (such as sand, gravel, or demolition waste) for construction purposes. A typical dump truck has a frame and an open-box bed which is movably mounted to the frame. As the open-box bed is hinged at a rear or side portion of the bed, hydraulic arms are mounted between the frame and another portion of the bed which allows the bed to be moved from a rest position, in which the bed is parallel to the ground, to a delivery position, in which the other portion of the bed is raised relatively to the hinged portion of the bed. Accordingly, when the bed is moved from the rest position to the delivery position, the bulk material in the bed can be delivered ("dumped") on the ground behind or on the side of the dump truck via a delivery gate or opening.

In order for a dump truck company to get paid for a delivery that occurred at a given delivery site, a signed proof of delivery is generally required at some point during the payment process. To satisfy this requirement, and thus ensure swift payment, once a delivery of bulk material has occurred at the delivery site, the dump truck's driver generally has to get out of the truck and find someone working at the delivery site to get a proof of delivery signed.

Although existing dump trucks and existing techniques to get signed proofs of delivery, including those involving getting signatures on a mobile electronic device, have been found to be satisfactory to a certain degree, there remains room for improvement.

SUMMARY

In an aspect, there is described a method for confirming delivery of bulk material from a bed of a dump truck based on measurements performed using a hydraulic pressure sensor. The hydraulic pressure sensor can measure hydraulic pressure values indicative of a pressure of a hydraulic fluid used to move the bed of the dump truck as the bed is moved from a rest position and a delivery position over a given period of time. Upon comparing a slope at which at least some of the measured hydraulic pressure values vary to a delivery slope threshold, a delivery confirmation indicative that a delivery of the bulk material has occurred can be generated. In some embodiments, the need to have a signed proof of delivery can be only optional as the delivery of bulk material can be otherwise confirmed based on the hydraulic pressure measurements.

In accordance with a first aspect of the present disclosure, there is provided a method for confirming delivery of bulk material from a bed of a dump truck based on hydraulic pressure, the dump truck having a driving device moving the bed between a rest position and a delivery position, the method comprising: using a hydraulic pressure sensor, measuring a plurality of hydraulic pressure values indicative of pressure of a hydraulic fluid of the driving device as the bed is moved; and using a controller communicatively coupled to the hydraulic pressure sensor: monitoring a slope at which at least some of the plurality of hydraulic pressure values vary over a given period of time; and generating a delivery confirmation indicative that a delivery of the bulk material has occurred based on a comparison between said monitored slope and a delivery slope threshold.

Further in accordance with the first aspect of the present disclosure, said the step of generating can for example comprise generating a delivery confirmation when said slope exceeds said delivery slope threshold.

Still further in accordance with the first aspect of the present disclosure, said comparison can for example include, when a polarity of said slope corresponds to a polarity of said delivery slope threshold, comparing a value of said slope to a value of said delivery slope threshold, said generating comprising generating a delivery confirmation when said value of said slope is below said value of said delivery slope threshold.

Still further in accordance with the first aspect of the present disclosure, said at least some of the plurality of hydraulic pressure values can for example have a given number of the most recently measured hydraulic pressure values, said monitoring including updating the at least some of the plurality of hydraulic pressure values on which are based on the slope as new hydraulic pressure values are measured.

Still further in accordance with the first aspect of the present disclosure, said period of time over which the slope is monitored can for example increase as function of a maximal one of the at least some of the hydraulic pressure values.

Still further in accordance with the first aspect of the present disclosure, the method can for example further comprise receiving a GPS signal indicative of a GPS position of the dump truck.

Still further in accordance with the first aspect of the present disclosure, the hydraulic pressure values can for example be associated to a corresponding GPS position.

Still further in accordance with the first aspect of the present disclosure, the method can for example further comprise determining that said GPS position associated to the at least some of the hydraulic pressure values associated to said slope are within a predetermined region, said delivery confirmation further comprising a location confirmation indicative that the delivery has occurred within the predetermined region.

Still further in accordance with the first aspect of the present disclosure, the method can for example further comprise displaying said confirmation on a user interface.

Still further in accordance with the first aspect of the present disclosure, the method can for example further comprise determining an amount of delivered bulk material based on the at least some of the hydraulic pressure values, said delivery confirmation comprising said amount.

Still further in accordance with the first aspect of the present disclosure, the method can for example further comprise determining an amount of bulk material remaining on the bed of the dump truck based on the at least some of the hydraulic pressure values.

In accordance with a second aspect of the present disclosure, there is provided a system comprising: a frame; a bed movably mounted to the frame for receiving bulk material; a driving device mounted to the frame for driving, using a hydraulic fluid, movement of the bed between a rest position and a delivery position; a hydraulic pressure sensor mounted to the driving device for measuring pressure of the hydraulic fluid; a controller communicatively coupled with the hydraulic pressure sensor, the controller being configured for performing the steps of: receiving a plurality of hydraulic pressure values indicative of pressure of the hydraulic fluid as the bed is moved; and monitoring a slope at which at least some of the plurality of hydraulic pressure values vary over a given period of time; and generating a delivery confirmation indicative that a delivery of bulk material has occurred based on a comparison between said monitored slope and a delivery slope threshold.

Further in accordance with the second aspect of the present disclosure, the frame can for example be a frame of a dump truck, the bed moving between a rest position, in which the bed is parallel to the ground, and a delivery position, in which the bed is tilted relative to the ground.

Still further in accordance with the second aspect of the present disclosure, the system can for example further comprise a GPS sensor mounted fixedly relative to the frame, the GPS sensor generating a GPS signal indicative of a GPS position of the frame as said hydraulic pressure values are measured.

Still further in accordance with the second aspect of the present disclosure, the hydraulic pressure values can for example be associated to a corresponding GPS position.

Still further in accordance with the second aspect of the present disclosure, the system can for example further comprise determining that said GPS position associated to the hydraulic pressure values associated to said slope are within a predetermined region, said delivery confirmation further comprising a location confirmation indicative that the delivery has occurred within the predetermined region.

Still further in accordance with the second aspect of the present disclosure, the system can for example further comprise a communication unit communicatively coupled to the controller, the communication unit communicating the generated confirmation towards a remote network.

Still further in accordance with the second aspect of the present disclosure, the system can for example further comprise a user interface communicatively coupled to the controller, the user interface displaying said confirmation.

Still further in accordance with the second aspect of the present disclosure, the system can for example further comprise determining an amount of delivered bulk material based on the at least some of the hydraulic pressure values, said delivery confirmation comprising said amount.

Still further in accordance with the second aspect of the present disclosure, the system can for example further comprise determining an amount of bulk material remaining on the bed of the dump truck based on the at least some of the hydraulic pressure values.

In accordance with a third aspect of the present disclosure, there is provided a method for confirming delivery of bulk material from a bed of a dump truck based on hydraulic pressure, the method comprising: using a driving device of the dump truck, moving the bed between a rest position and a delivery position; using a hydraulic pressure sensor mounted to the driving device, measuring a plurality of hydraulic pressure values indicative of pressure of a hydraulic fluid of the driving device as the bed is moved; using a controller communicatively coupled to the hydraulic pressure sensor: monitoring a slope at which at least some of the plurality of hydraulic pressure values vary over a given period of time; and generating a delivery confirmation indicative that a delivery of the bulk material has occurred based on a comparison between said monitored slope and a delivery slope threshold.

Many further features and combinations thereof concerning the present improvements will appear to those skilled in the art following a reading of the instant disclosure.

DESCRIPTION OF THE FIGURES

In the figures,

FIG. 7 is a schematic view of an example of a computing device of the controller of FIG. 1, in accordance with one or more embodiments.

DETAILED DESCRIPTION

Figure 1:
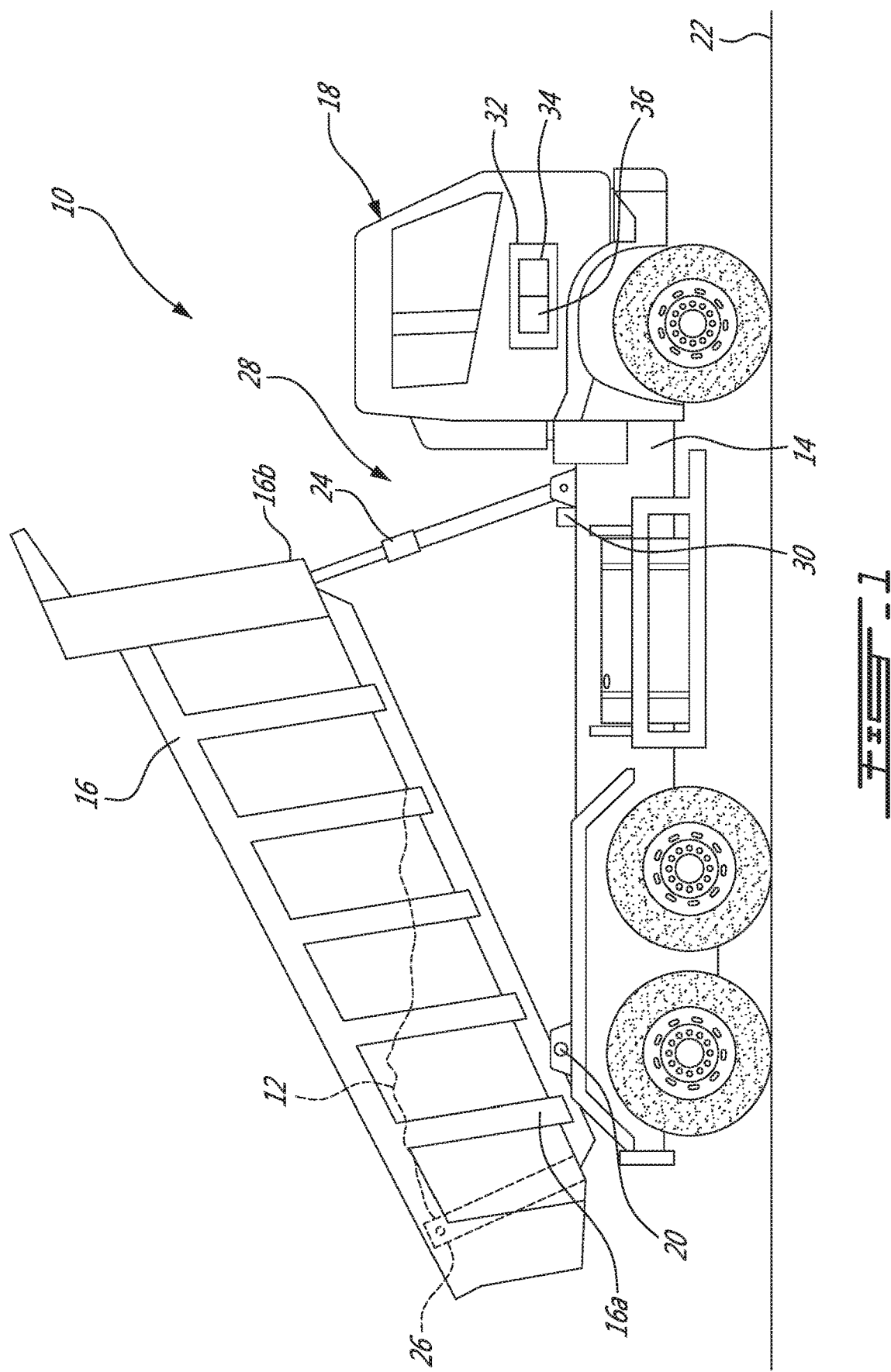
FIG. 1 is a side view of an example of a dump truck having a system for confirming delivery of bulk material, incorporating a hydraulic pressure sensor communicatively coupled to a controller, in accordance with one or more embodiments.

FIG. 1 shows an example of a system 10 for delivering bulk material 12. As shown, the system 10 has a frame 14 and a movable bed 16 which is movably mounted to the frame 14. In this specific example, the frame 14 is part of a dump truck 18, and the bed 16 is an open bed. As such, the bed 16 can be tilted about a tilt axis 20 which is generally horizontally oriented relative to the ground 22.

As shown, the bed 16 is hinged at a rear portion 16a of the bed 16 whereas hydraulic arms 24 are mounted between the frame 14 and a front portion 16b of the bed 16 which allow the bed 16 to be raised relatively to the ground 22. More specifically, the bed 16 can be moved from a rest position, in which the bed 16 is parallel to the ground 22, to a delivery position, in which the front portion 16b of the bed 16 is raised relatively to the rear portion 16a of the bed 16. Accordingly, when the bed 16 is moved from the rest position to the delivery position, the bulk material 12 in the bed 16 can be delivered ("dumped") on the ground 22 behind the dump truck 18 via a delivery gate 26.

As depicted in this example, the system 10 has a driving device 28 mounted to the frame 14 for driving movement of the bed 16 using a hydraulic fluid. In this example, the hydraulic fluid can be oil (e.g., mineral oil), water and the like. A hydraulic pressure sensor 30 is mounted to the driving device 28 for measuring pressure of the hydraulic fluid as it is used to drive movement of the bed 16.

Still referring to FIG. 1, the system 10 has a controller 32 which is communicatively coupled at least to the hydraulic pressure sensor 30. The communication between the controller 32 and the hydraulic pressure sensor 30 can be provided by a wireless connection, a wired connection, or a combination thereof.

In this specific embodiment, the system 10 has a user interface 34 which is communicatively coupled with the controller 32. As can be understood, the user interface 34 can be used to receive inputs and/or display data. Examples of inputs that can be received via the user interface 34 can include a delivery instruction (e.g., partial delivery, full delivery) of the bulk material 12, instructions to open or unlock the delivery gate 26 and the like. Examples of data that can be displayed by the user interface 34 can include hydraulic pressure values received from the hydraulic pressure sensor 30, amount of bulk material 12 remaining on the bed 16, and/or delivered amounts indicative of the amount of bulk material 12 delivered in a recent delivery as determined using the methods described herein. In embodiments where the system 10 has a global positioning system (GPS) sensor 36, such as the one illustrated in FIG. 1, the user interface 34 can display where the delivery has occurred and/or whether the delivery has occurred with a predetermined GPS location, an example of which being described with reference to FIG. 6 below.

Figure 2:
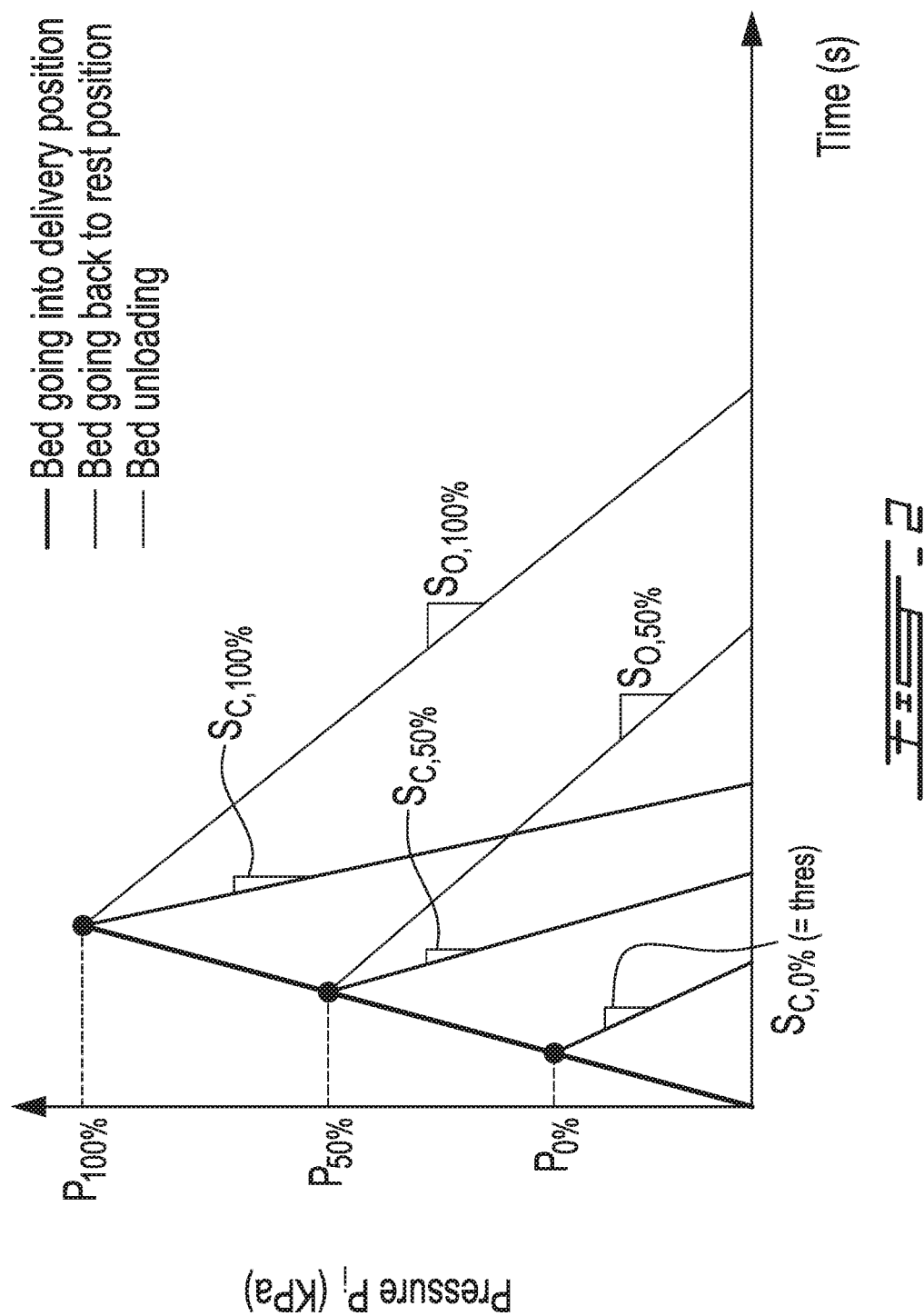
FIG. 2 is a graph showing hydraulic pressure as a function of time for different scenarios including hydraulic pressure values as the bed is moved to a delivery position, hydraulic pressure values as the bed is moved to a rest position with a delivery gate closed, and hydraulic pressure values during a delivery, in accordance with one or more embodiments.

FIG. 2 shows an example of hydraulic pressure values $P_i$ measured over time for different scenarios (with i being a positive integer in this example). Reference will be made to the system 10 of FIG. 1 for ease of reading. As can be expected, when the bed 16 is moved from the rest position to the delivery position, with the delivery gate 26 closed (i.e., no bulk material 12 is being dumped on the ground), the amount of hydraulic pressure experienced by the hydraulic fluid is lower when the bed 16 is empty (i.e., $P_{0\%}$) than when the bed 16 is half full (i.e., $P_{50\%}$) or completely full (i.e., $P_{100\%}$).

Now, should the bed 16 be moved back to the rest position with the delivery gate 26 closed, the hydraulic pressure values $P_i$ would decrease back to zero or nearly zero. More specifically, in the scenario where the bed 16 is empty, the hydraulic pressure values $P_i$ would go back to zero at a first slope $S_{C,0\%}$, with the indicia C denoting that the delivery gate 26 is closed. Similarly, in the scenario where the bed 16 is half-full, the hydraulic pressure values would go back to zero at a second slope $S_{C,50\%}$. In the scenario where the bed 16 is full, the hydraulic pressure values would go back to zero at a third slope $S_{C,100\%}$. As can be understood, as the weight of bulk material 12 increases in the bed 16, the slope at which the hydraulic pressure values $P_i$ would go back to zero should decrease correspondingly. Accordingly, one can expect the third slope $S_{C,100}\%$ to be lower than the second slope $S_{C,50}\%$, which is in turn expected to be lower than the first slope $S_{C,0}\%$, $S_{C,100}\% < S_{C,50} < S_{C,0}\%$. If the polarity, i.e., the minus sign of the slopes $S_{C,100}\%$, $S_{C,50}\%$, and $S_{C,0}\%$, is neglected, and only the absolute values of the first, second and third slopes $|S_{C,100\%}|$, $|S_{C,50\%}|$ and $|S_{C,0\%}|$ are considered, then the value of the third slope $|S_{C,100\%}|$ is expected to be greater than the value of the second slope $|S_{C,50\%}|$, which is in turn expected to be lower than the value of the first slope $|S_{C,0\%}|$.

The inventor found that when the bed 16 is in the delivery position with the delivery gate 26 open, the hydraulic pressure values $P_i$ tend to decrease as well. However, in a case where the bulk material 12 is actually being delivered, the slope at which the hydraulic pressure values $P_i$ decreases is lower compared to scenarios where the bed 16 is moved back to the rest position with the delivery gate 26 closed. For instance, in the scenario of the bed 16 being half-full, it was found that the hydraulic pressure values decrease at a fourth slope $S_{O,50\%}$ during delivery whereas the hydraulic pressure values decrease at a fifth slope $S_{O,100\%}$ during delivery when the bed 16 was initially full, with the indicia O denoting that the delivery gate 26 is open. It was found that as the fourth and fifth slopes $S_{O,50\%}$ and $S_{O,100\%}$ are lower than the first, second and third slopes $S_{C,0\%}$, $S_{C,50\%}$ and $S_{C,100\%}$, the system 10 can distinguish a scenario where a delivery has not occurred (e.g., faked) from a scenario where delivery has actually occurred. Accordingly, in such scenarios, getting a signed proof of delivery may be only optional, as the system 10 can generate a delivery confirmation indicative that a delivery of the bulk material has actually occurred based on measured hydraulic pressure values $P_i$, and not from a signature of a witness at the delivery site. Moreover, there can be a direct relationship between the initial maximal one of the hydraulic pressure values $P_i$ just before the pressure begins to decrease and this maximal value can be indicative of the amount of bulk material 12 remaining on the bed 16 of the dump truck 18.

Figure 3:
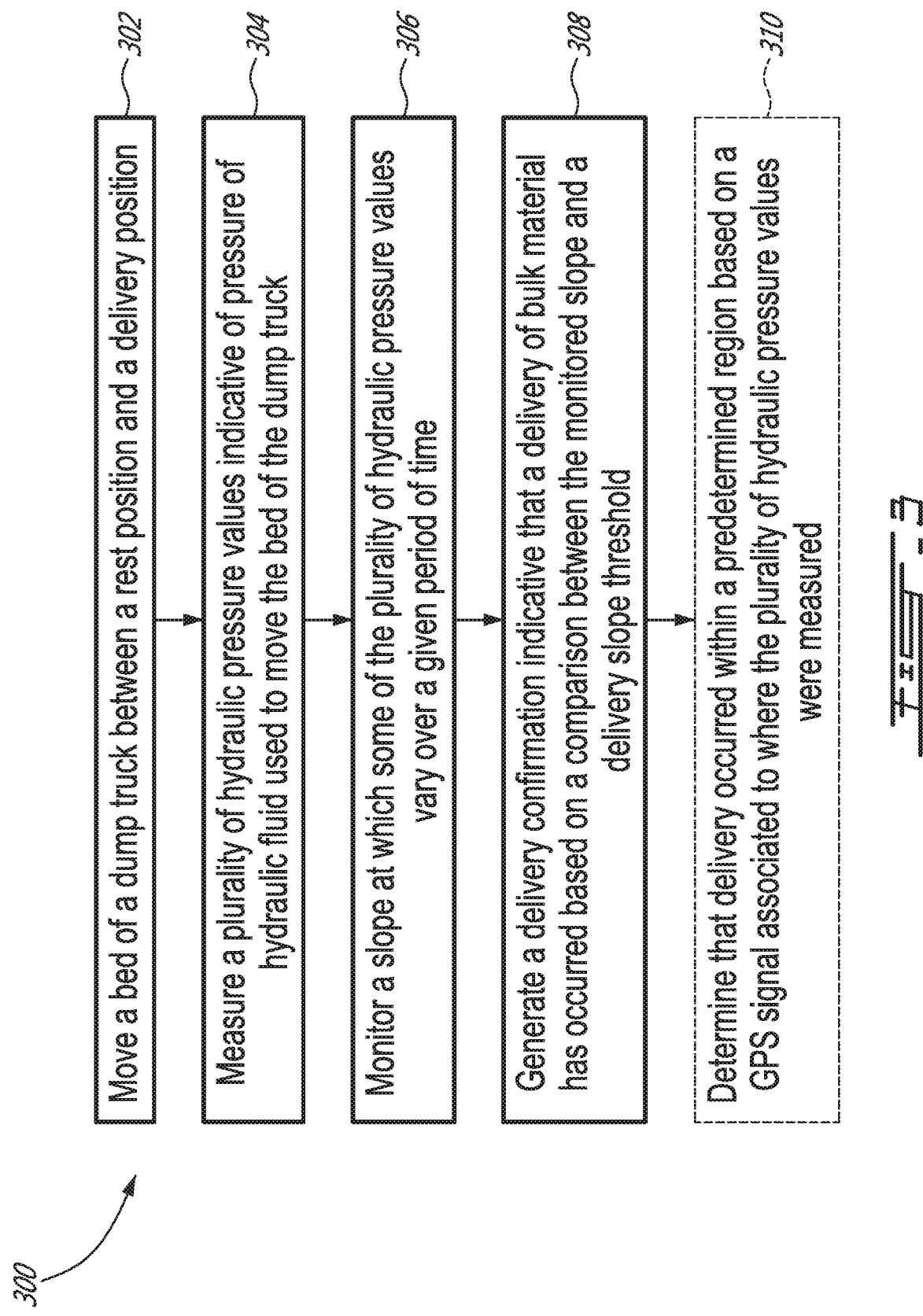
FIG. 3 is a flow chart of an example of a method for confirming delivery of bulk material using the system of FIG. 1, in accordance with one or more embodiments.

FIG. 3 shows an example of a method 300 for confirming delivery of the bulk material 12 from the bed 16 of the dump truck 18 based on hydraulic pressure, as discussed above. Again, reference is made to the system 10 of FIG. 1 for ease of reading.

As shown, the method has a step 302 of moving the bed 16 of the dump truck 18 between a rest position and a delivery position. The method 300 can be continuously performed during the normal operation of the dump truck 18. Only when the system 10 identifies that a delivery has occurred can a delivery confirmation be generated, as described below.

At step 304, a plurality of hydraulic pressure values $P_i$ are measured by the hydraulic pressure sensor 30. Each hydraulic pressure value $P_i$ is indicative of pressure of the hydraulic fluid of the driving device 28 as the bed 16 is moved between the rest position and the delivery position. The hydraulic pressure values $P_i$ can be measured and processed by the controller 32 in real time or quasi-real time, depending on the embodiment. The hydraulic pressure values $P_i$ can also be stored on a memory of the controller 32 for later processing, or subsequent delivery confirmation generation, for instance. Alternatively, the hydraulic pressure values $P_i$ can be sent to a remote location using wireless communication, wired communication, and/or a combination of wired and wireless communication for further data processing.

At step 306, the controller 32 monitors a slope $S(P_i)$ at which some of the measured hydraulic pressure values $P_i$ vary over a given period of time $\Delta T$. In some embodiments, the controller 32 can update the monitored slope $S(P_i)$ in real time or quasi-real time as new hydraulic pressure values $P_i$ are measured.

The period of time $\Delta T$ during which the hydraulic pressure values $P_i$ are used for the determination of the slope $S(P_i)$ can be a predetermined period of time $\Delta T_0$ in some embodiments. In such examples, the period of time can be about 15 seconds, preferably about 30 seconds, and most preferably less than 1 minute. In some other embodiments, the period of time $\Delta T$ can depend on a maximal one of the hydraulic pressure values $P_i$, $P_{i|max}$. For instance, referring now to FIG. 2, whether the bed 16 is half full or completely full will dictate the period of time $\Delta T$ during which the measured hydraulic pressure values $P_i$ will decrease. Accordingly, when it is determined that the maximal one of some of the recently measured hydraulic pressure values is, $P_{i|max}$, then the controller 32 may monitor the slope based on hydraulic pressure values measured during a given period of time $\Delta T(P_{i|max})$.

In some embodiments, the hydraulic pressure values $P_i$ on which is based the monitored slope $S(P_i)$ can include a predetermined number N of the most recently measured hydraulic pressure values $P_i$. For instance, the monitored slope $S(P_i)$ can be based on the 10 most recent hydraulic pressure values $P_i$, on the 100 most recent hydraulic pressure values P or on the 1000 most recent hydraulic pressure values $P_i$, depending on the embodiment. In some embodiments, the hydraulic pressure values $P_i$ are measured at a greater frequency $f_1$ and thus the number $N_1$ of hydraulic pressure values can be greater. In contrast, in some embodiments, the hydraulic pressure values are measured at a lower frequency $f_2$ and thus the number $N_2$ of hydraulic pressure values can be lower, i.e., $f_1 > f_2$ and $N_1 > N_2$. Examples of frequencies that can be used to monitor the hydraulic pressure values $P_i$ can include, but not limited to, 1 Hz, 5 Hz, 25 Hz and the like.

At step 308, the controller 32 generates a delivery confirmation indicative that a delivery of the bulk material 12 has occurred based on a comparison between the monitored slope $S(P_i)$ and a delivery slope threshold $S_{thres}$.

In some embodiments, the delivery slope threshold $S_{thres}$ has both a polarity (+ or −) and a value ($|S_{thres}|$). In such embodiments, the controller 32 can generate the delivery confirmation when the monitored slope exceeds the delivery slope threshold, i.e., when $-|S(P_i)|>-|S_{thres}|$). However, in some embodiments, it is implicit that the delivery slope threshold has a negative polarity (i.e., as the hydraulic pressure values $P_i$ decrease), and thus the delivery slope threshold $S_{thres}$ is represented only by a value $|S_{thres}|$ In these embodiments, the controller 32 can generate the delivery confirmation when the value of the monitored slope $S(P_i)$, typically represented only by a value $|S(P_i)|$ as well, is below the value of the delivery slope threshold, i.e., when $|S(P_i)| < |S_{thres}|$.

In embodiments where the system 10 has the GPS sensor 36, the controller 32 can receive a GPS signal indicative of a GPS position of the dump truck 18. In these embodiments, each of the hydraulic pressure values can be associated to a corresponding GPS position, in which case the method 300 can have a step 310 of determining that the GPS position associated to the at least some of the hydraulic pressure values $P_i$ associated to the monitored slope $S(P_i)$ are within a predetermined region where delivery of bulk material is expected.

Figure 4:
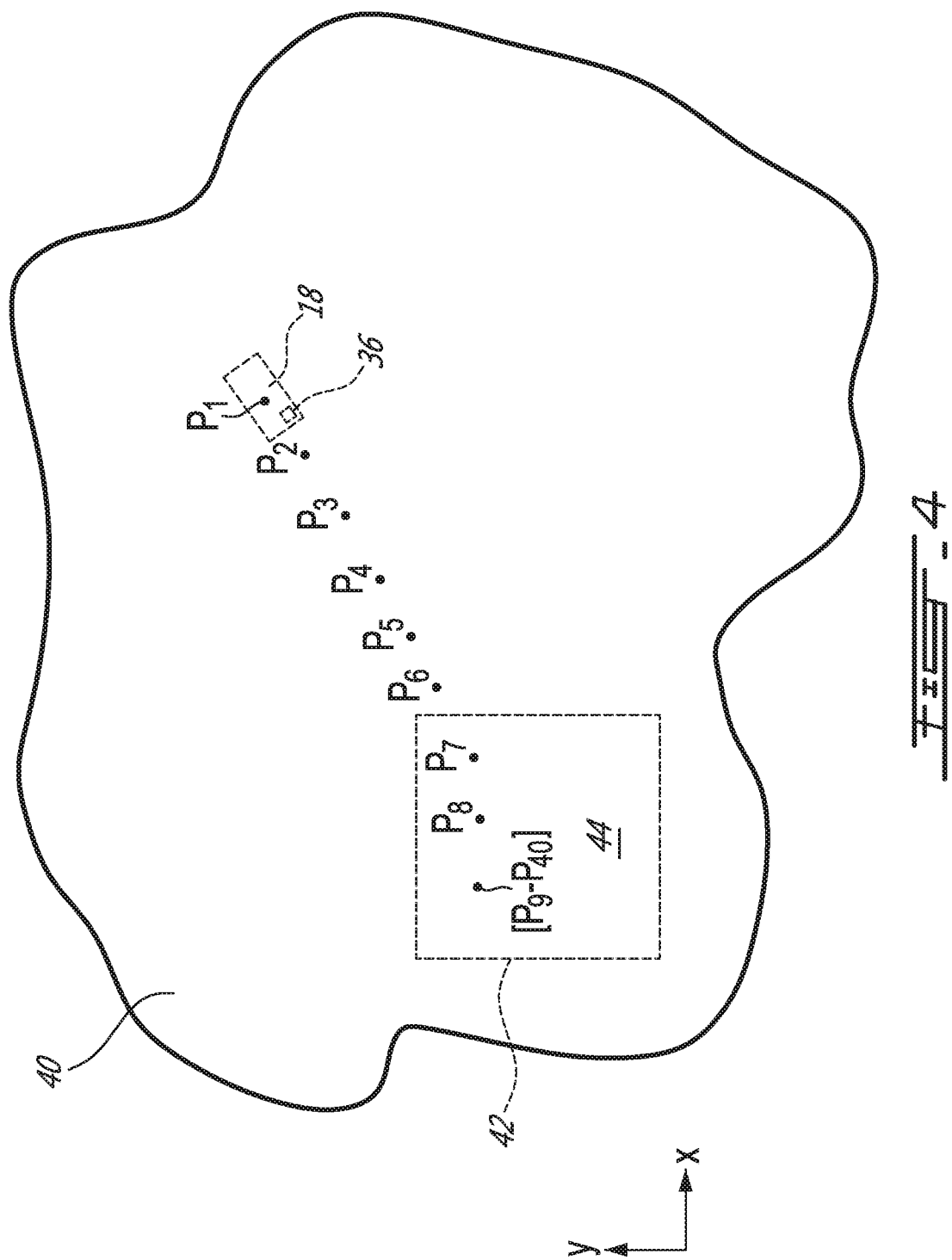
FIG. 4 is a top plan view of a construction site, showing a GPS region indicating where bulk material is to be delivered, in accordance with one or more embodiments.

FIG. 4 shows a top view of a construction site 40 encompassing a predetermined region 42. As shown, the dots associated to hydraulic pressure values $P_i$ for i ranging between 1 and 40 identifies the GPS position where each one of the hydraulic pressure values $P_i$ has been measured. As shown, hydraulic pressure values $P_i$ for i ranging between 1 and 8 are measured as the dump truck 18 is moving on the construction site 40, and at some point, enters the predetermined region 42. In this specific example, the predetermined region 42 corresponds to a delivery site 44 where the bulk material 12 is to be delivered. As shown, hydraulic pressure values $P_i$ for i ranging between 9 and 40 have been measured at a relatively fixed GPS position. In this case, it can be determined, by the controller of the system mounted to the dump truck 18 or using a remote system, that the hydraulic pressure values $P_i$ for i ranging between 9 and 40 shows a decreasing slope which, when compared to the delivery slope threshold $S_{thres}$, is indicative that a delivery occurred. In such an embodiment, the delivery confirmation can include a location confirmation indicative that the delivery has occurred within the predetermined region 42, thereby confirming that not only has a delivery occurred but also that the delivery has occurred at the expected delivery site 44, as may be required in at least some payment processes.

Figure 5:
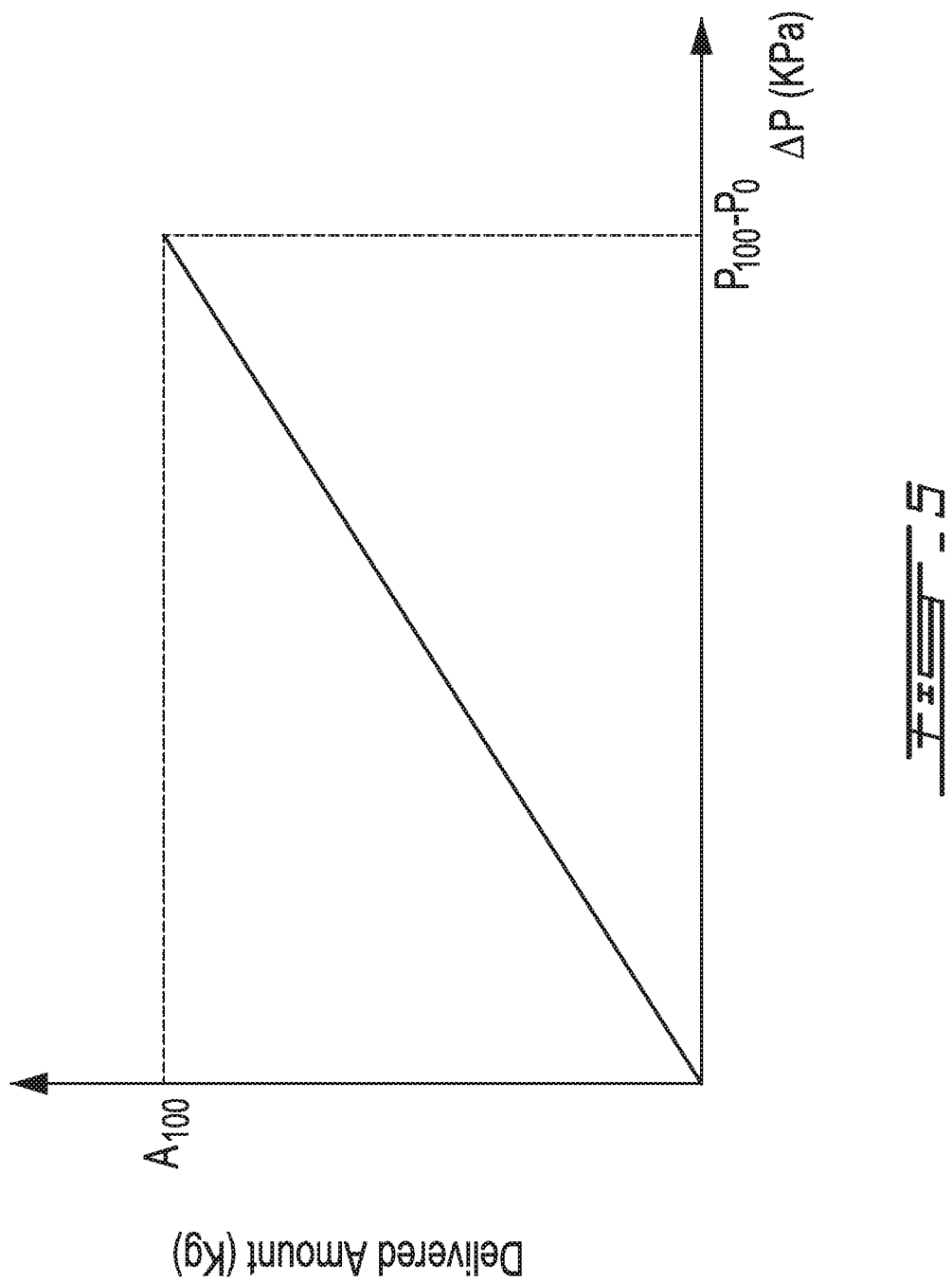
FIG. 5 is a graph showing delivered amount of bulk material as a function of a hydraulic pressure difference, in accordance with one or more embodiments.

In some embodiments, the controller 32 can be configured to determining an amount of delivered bulk material based on the hydraulic pressure values $P_i$ measured by the hydraulic pressure sensor 30 based on reference data pertaining to delivered amounts versus hydraulic pressure values $P_i$. FIG. 5 shows an example of such reference data. More specifically, FIG. 5 shows delivered amounts of bulk material versus differences in hydraulic pressure values. In this embodiment, the controller 32 can determine a difference between a maximal one of the hydraulic pressure values $P_i$ used to monitor the slope $S(P_i)$, $P_{i|min}$, and on a minimal one of the hydraulic pressure values $P_i$ used to monitor the slope $S(P_i)$, $P_{i|min}$. In some embodiments, the delivered amount of bulk material and/or the amount of bulk material remaining on the bed can be estimated from the initial maximum pressure before unloading (MPBU). Once this determination is made, the controller 32 can associate the determined difference to an amount of delivered bulk material, which may later be included in the delivery confirmation in at least some embodiments. As can be understood, the reference data can depend on the type of dump truck, on the type of bulk material, on the type of driving device and the like. Using such reference data, the controller 32 can also determine that partial or full deliveries have occurred, and the delivered amounts associated to such partial or full deliveries.

Figure 6:
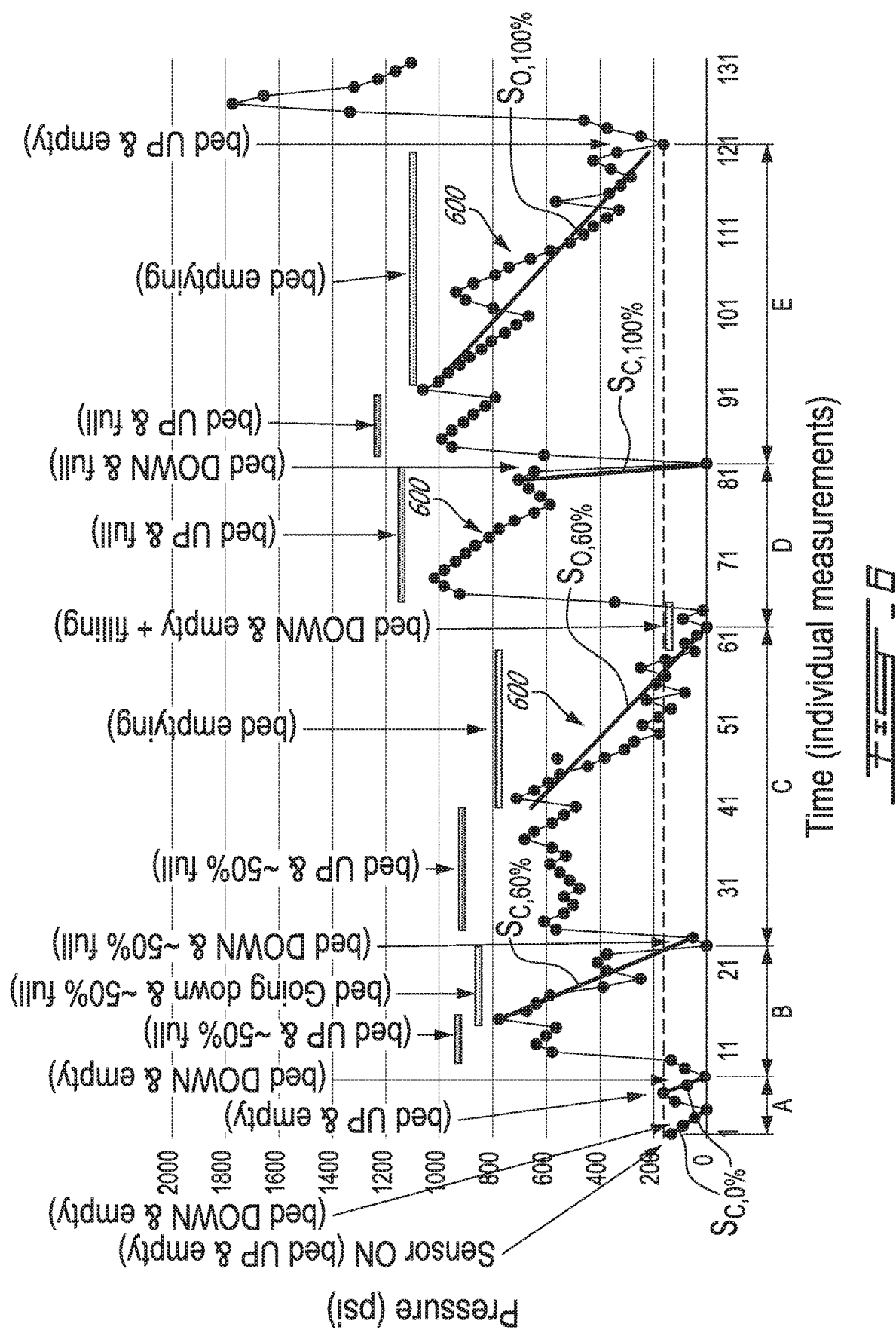
FIG. 6 is a graph showing hydraulic pressure as a function of time as the bed is moved between a rest position and a delivery position with different amounts of bulk material received in the bed, in accordance with one or more embodiments.

FIG. 6 shows a series of hydraulic pressure values $P_i$ as the bed 16 of the dump truck 18 is moved between the rest position and the delivery position across different phases. For instance, phase A shows the hydraulic pressure values $P_i$ as the bed 16 is moved from the delivery position to the rest position, back to the delivery position and then back to the rest position as the bed 16 is empty. Phase B shows the hydraulic pressure values $P_i$ as the bed 16 is moved in the delivery position and back to the rest position as the bed 16 is partially full. Phase C shows the hydraulic pressure values $P_i$ as the bed 16 is moved in the delivery position, during a delivery up until the hydraulic pressure values go back to zero, and then as the bed 16 is moved to the rest position. Phase D shows the hydraulic pressure values $P_i$ as the bed 16 is moved from the rest position to the delivery position and then back to the rest position as the bed 16 is full. Phase E shows the hydraulic pressure values $P_i$ as the bed 16 is moved from the rest position to the delivery position and then during a delivery up. At the end of phase E, the bed 16 is still in the delivery position, thereby showing a hydraulic pressure value $P_i$ equivalent to that at the beginning of phase A. It is noted that saw tooth oscillations 600 can be present as the hydraulic pressure values $P_i$ decrease, regardless of whether the bed 16 was only moved to the rest position or that delivery has actually occurred. Such saw tooth oscillations can be due to i) the telescopic members of the hydraulic arms 24 of the dump truck 18 moving relative to one another, ii) to the dump truck 18 generally going forward during delivery to allow the bulk material to be delivered on the ground 22, and iii) other such situations.

As can be understood in some embodiments, it may be convenient to set the delivery slope threshold $S_{thres}$ to a slope $S_{C,0\%}$ that can be obtained as the bed 16 is moved from the delivery position to the rest position when the bed 16 is empty. In these embodiments, as soon as the hydraulic pressure values $P_i$ show a slope greater than the slope $S_{C,0\%}$, it can be determined that a delivery has occurred. Examples of slopes delivery slope threshold $S_{thres}$ can include about −12 psi/s in this specific embodiment.

The controller 32 can be provided as a combination of hardware and software components. The hardware components can be implemented in the form of a computing device 700, an example of which is described with reference to FIG. 7.

As shown, the computing device 700 can have a processor 702, a memory 704, and I/O interface 706. Instructions 708 for performing the method 300 can be stored on the memory 704 and accessible by the processor 702.

The processor 702 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 704 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 706 enables the computing device 700 to interconnect with one or more input devices, such as the hydraulic pressure sensor 30, the user interface 34 and the GPS sensor 34, or with one or more output devices such as the user interface 34 or a remote network.

Each I/O interface 706 enables the controller 32 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. In some embodiments, the controller 32 is mounted to the dump truck. However, in some other embodiments, the controller 32 can be at a remote location from the dump truck while being communicatively coupled to the hydraulic pressure sensor for receiving the measured hydraulic pressure values $P_i$.

In some embodiments, the software application wholly or partially embodying the method 300 is stored on the memory 704 and accessible by the processor 702 of the computing device 700. The computing device 700 and such software application are meant to be examples only. Other suitable embodiments of the controller 32 can also be provided, as it will be apparent to the skilled reader.

As can be understood, the examples described above and illustrated are intended to be exemplary only. Although a typical dump truck having a bed behind the driving cabin has been illustrated in this disclosure, it is intended that the systems and methods described herein can be used with other types of dump trucks. For instance, the methods and systems described herein can also be used with dump trucks having their beds in front of the driving cabin or on either side. The term "dump truck" is meant to be construed broadly so as to encompass any suitable type of dump trucks including, but not limited to, standard dump truck, semi trailer end dump truck, transfer dump truck, truck and pup, super dump truck, semi-trailer bottom dump truck, double and triple trailer bottom dump truck, side dump truck, winter service vehicles, roll-off trucks, off-highway dump trucks such as haul trucks and articular haulers, dumper truck, tipper truck, tip-truck, tip-trailer, tipper truck, tipper and the like. The scope is indicated by the appended claims.

What is claimed is:

1. A method for confirming delivery of bulk material from a bed of a dump truck based on hydraulic pressure, the dump truck having a driving device moving the bed between a rest position and a delivery position, the method comprising:
   using a hydraulic pressure sensor, measuring a plurality of hydraulic pressure values indicative of pressure of a hydraulic fluid of the driving device as the bed is moved; and
   using a controller communicatively coupled to the hydraulic pressure sensor:
      monitoring a slope at which at least some of the plurality of hydraulic pressure values vary over a given period of time; and
      generating a delivery confirmation indicative that a delivery of the bulk material has occurred based on a comparison between said monitored slope and a delivery slope threshold;
   wherein said at least some of the plurality of hydraulic pressure values have a given number of the most recently measured hydraulic pressure values, said monitoring including updating the at least some of the plurality of hydraulic pressure values on which are based on the slope as new hydraulic pressure values are measured.

2. The method of claim 1 wherein said generating comprising generating a delivery confirmation when said slope exceeds said delivery slope threshold.

3. The method of claim 1 wherein said comparison includes, when a polarity of said slope corresponds to a polarity of said delivery slope threshold, comparing a value of said slope to a value of said delivery slope threshold, said generating comprising generating a delivery confirmation when said value of said slope is below said value of said delivery slope threshold.

4. The method of claim 1 wherein said period of time over which the slope is monitored increases as function of a maximal one of the at least some of the hydraulic pressure values.

5. The method of claim 1 further comprising receiving a GPS signal indicative of a GPS position of the dump truck.

6. The method of claim 5 wherein the hydraulic pressure values are associated to a corresponding GPS position.

7. The method of claim 6 further comprising determining that said GPS position associated to the at least some of the hydraulic pressure values associated to said slope are within a predetermined region, said delivery confirmation further comprising a location confirmation indicative that the delivery has occurred within the predetermined region.

8. The method of claim 1 further comprising displaying said confirmation on a user interface.

9. The method of claim 1 further comprising determining an amount of delivered bulk material based on the at least some of the hydraulic pressure values, said delivery confirmation comprising said amount.

10. The method of claim 1 further comprising determining an amount of bulk material remaining on the bed of the dump truck based on the at least some of the hydraulic pressure values.

11. A system comprising:
a frame;
a bed movably mounted to the frame for receiving bulk material;
a driving device mounted to the frame for driving, using a hydraulic fluid, movement of the bed between a rest position and a delivery position;
a hydraulic pressure sensor mounted to the driving device for measuring pressure of the hydraulic fluid;
a controller communicatively coupled with the hydraulic pressure sensor, the controller being configured for performing the steps of:
receiving a plurality of hydraulic pressure values indicative of pressure of the hydraulic fluid as the bed is moved; and
monitoring a slope at which at least some of the plurality of hydraulic pressure values vary over a given period of time; and
generating a delivery confirmation indicative that a delivery of bulk material has occurred based on a comparison between said monitored slope and a delivery slope threshold
wherein said at least some of the plurality of hydraulic pressure values have a given number of the most recently measured hydraulic pressure values, said monitoring including updating the at least some of the plurality of hydraulic pressure values on which are based on the slope as new hydraulic pressure values are measured.

12. The system of claim 11 wherein the frame is a frame of a dump truck, the bed moving between a rest position, in which the bed is parallel to the ground, and a delivery position, in which the bed is tilted relative to the ground.

13. The system of claim 11 further comprising a GPS sensor mounted fixedly relative to the frame, the GPS sensor generating a GPS signal indicative of a GPS position of the frame as said hydraulic pressure values are measured.

14. The system of claim 13 wherein the hydraulic pressure values are associated to a corresponding GPS position.

15. The system of claim 14 further comprising determining that said GPS position associated to the hydraulic pressure values associated to said slope are within a predetermined region, said delivery confirmation further comprising a location confirmation indicative that the delivery has occurred within the predetermined region.

16. The system of claim 11 further comprising a communication unit communicatively coupled to the controller, the communication unit communicating the generated confirmation towards a remote network.

17. The system of claim 11 further comprising a user interface communicatively coupled to the controller, the user interface displaying said confirmation.

18. The system of claim 11 further comprising determining an amount of delivered bulk material based on the at least some of the hydraulic pressure values, said delivery confirmation comprising said amount.

19. The system of claim 11 further comprising determining an amount of bulk material remaining on the bed of the dump truck based on the at least some of the hydraulic pressure values.

20. A method for confirming delivery of bulk material from a bed of a dump truck based on hydraulic pressure, the dump truck having a driving device moving the bed between a rest position and a delivery position, the method comprising:
using a hydraulic pressure sensor, measuring a plurality of hydraulic pressure values indicative of pressure of a hydraulic fluid of the driving device as the bed is moved; and
using a controller communicatively coupled to the hydraulic pressure sensor:
monitoring a slope at which at least some of the plurality of hydraulic pressure values vary over a given period of time; and
generating a delivery confirmation indicative that a delivery of the bulk material has occurred based on a comparison between said monitored slope and a delivery slope threshold;
wherein said period of time over which the slope is monitored increases as function of a maximal one of the at least some of the hydraulic pressure values.

* * * * *